United States Patent [19]

Sugihara

[11] 3,772,460

[45] Nov. 13, 1973

[54] COLOUR SYNCHRONIZING SYSTEM FOR A PAL COLOUR TELEVISION RECEIVER

[75] Inventor: Yasumasa Sugihara, Kanagawa-ken, Japan

[73] Assignee: The General Corporation, Kawasaki-shi, Japan

[22] Filed: Feb. 11, 1972

[21] Appl. No.: 225,396

[30] Foreign Application Priority Data

June 9, 1971 Japan ............................ 46/41279

[52] U.S. Cl. ............................ 178/5.4 P
[51] Int. Cl. ............................ H04n 9/46
[58] Field of Search ............................ 178/5.4 P

[56] References Cited

UNITED STATES PATENTS 2,736,859 2/1956 Pritchard et al. ................ 178/5.4 P

*Primary Examiner*—Robert L. Griffin
*Assistant Examiner*—George G. Stellar
*Attorney*—Ernest A. Greenside

[57] ABSTRACT

A colour synchronizing system for a colour television receiver is constructed according to a signal transmission system in which a pair of colour signals effect simultaneous quadrature balanced modulation of a colour subcarrier with respect to first and second mutually perpendicular modulation axes, the second of which undergoes phase alternation of 180° for successive horizontal lines and in which the resulting colour television signal includes a colour sync signal rendering it possible to discern the alternating polarities of a chrominance signal. Said colour sync signal includes first and second components carried in the initial part of each horizontal line so as to appear concurrently or in succession and has a phase displacement of 90° to each other, the first component being of a fixed phase, and the second component being of a phase which is periodically switched in a manner corresponding to the phase alternation of the second modulation axis for successive horizontal lines. For use in the demodulation along one of the modulation axes which does not undergo phase reversal, a reference subcarrier is formed by deriving a subcarrier of a frequency equal to double the frequency of the colour subcarrier from an offset subcarrier of a frequency fsc $\pm 2n - 1/2$ fH, where fsc denotes the frequency of the colour subcarrier, fH line frequency and $n$ a positive integer, frequency dividing by two the subcarrier of a frequency equal to double the frequency of the colour subcarrier, and choosing either polarity of the resulting subcarrier.

8 Claims, 11 Drawing Figures

COLOUR SYNCHRONIZING SYSTEM FOR A PAL COLOUR TELEVISION RECEIVER

Figure 1:
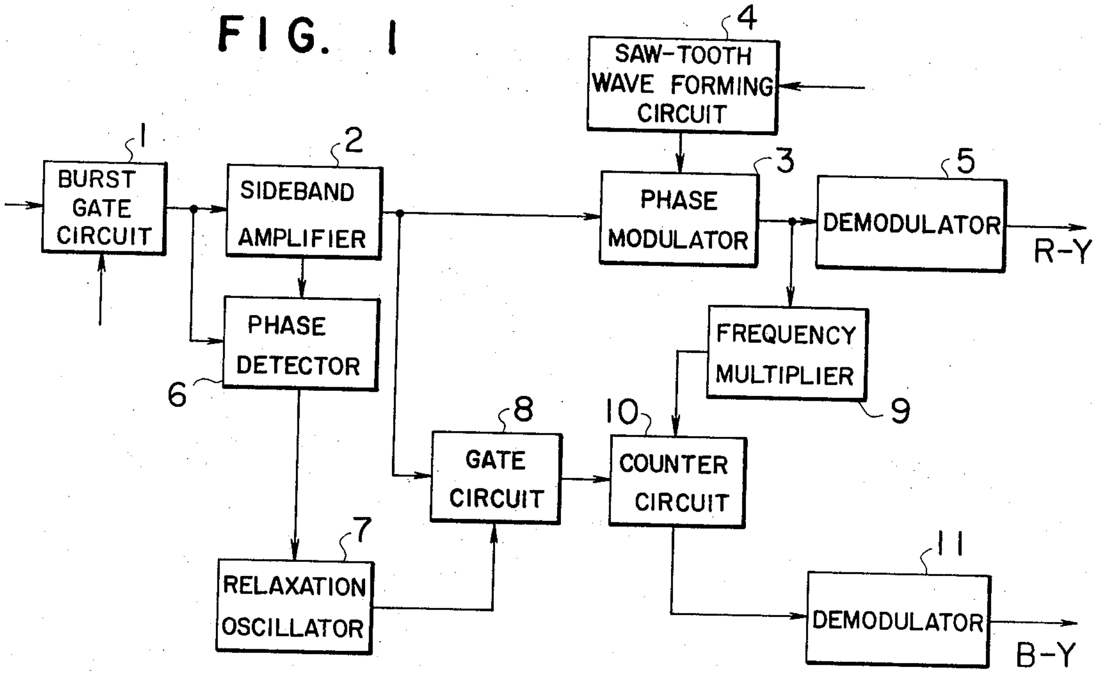

The invention relates to a colour synchronizing system in a colour television receiver incorporating PAL (phase alternation by lines) or similar signal transmission system in which a pair of colour signals effect simultaneous qudrature balanced modulation of a colour subcarrier with respect to mutually perpendicular first and second modulation axes, the second of which is reversed in phase by 180° for successive horizontal lines.

A colour television receiver incorporating such a signal transmission system requires, for demodulation from a chrominance signal of colour components along the first and second modulation axes, a pair of reference subcarries each of which maintains a fixed phase relationship with the chrominance signal. One of these reference subcarriers should have a fixed phase of 0° coincident with the first axis, while the other should have a phase displacement of 90° with respect to the first axis and a phase alternation of 180° for successive horizontal lines, which alternation must correspond to the periodic siwtching of the phase of the second axis. One technique for automatically accomplishing the phase control of these reference subcarries is disclosed in German Patent No. 1,260,520, which proposes the use of a colour sync signal or colour burst contained in a colour television signal and comprising first and second components appearing, coincidently in time or successively, in the initial part of each horizontal line, these components have a phase displacement of 90° with respect to each other, with the first component being of a fixed phase while the second component has a phase which periodically alternates by 180° for successive horizontal lines in corresponding manner to the periodic switching of the phase of the second modulation axis.

In the currently prevailing PAL system, the above mentioned first and second colour sync signal components appear concurrently in time as a synthesized signal so that the latter bears an alternating phase of +45° and −45° for successive horizontal lines. The synthesized colour sync signal is separated in a receiver into the two components, and the first component is used for synchornization of the refernece subcarrier while the second component is used to control the periodic switching of the phase of one of the subcarriers. In a conventional colour television receiver according to the PAL system, the reference subcarrier that is to be used to demodulate a colour difference signal along R-Y axis, which corresponds to the second modulation axis mentioned previously, form a chrominance signal is obtained typically by a technique mentioned in the following: The colour sync signal is initially extracted from the colour television signal and is phase demodulated to form a "discriminating control voltage" having half the horizontal scanning frequency. The control voltage thus formed provides synchronization of the oscillation of a square wave to produce an output waveform having the duration of a horizontal scanning line, hereinafter referred to as "line period." Such output waveform is applied as a voltage input to a switch, which is operable to effect change-over between a pair of output waveforms from a local oscillator which have a phase difference of 180° to each other, the oscillator being synchronized with the fundamental frequency of the colour burst received. The demodulation of the colour signal along the modulation axis having a fixed phase is effected by the use of a reference subcarrier having the same frequency as the colour subcarrier and synchronized with the fundamental wave of the colour sync signal.

On 730,981, other hand, there is proposed in copending U.S. Patent application No. 148,724, now U.S. Patent No. 3,730,981, an improved colour synchronizing system for a colour television receiver which obviates the need for the provision of the above mentioned switch in order to control the 180° phase alternation for one of the reference subcarriers which are used in the demodulation of a chrominance signal. Briefly, the proposed colour sychronizing system achieves demodulation of the colour signal along the modulation axis that undergoes 180° phase reversal by producing a subcarrier of a frequency fsc $\pm 1n - 1/2$ fH, where fsc denotes the frequency of a colour subcarrier; fH a horizontal line frequency and $n$ a positive integer. The subcarrier is phase modulated with a saw-tooth wave having the line frequency to yield a reference subcarrier whose phase is kept constant durng each line period. Synchronization for the subcarrier having the frequency fsc $\pm 2n - 1/2$ fH is achieved by using one of the sideband waves contained in the colour sync signal therefor.

It is an object of the invention to provide a colour synchronizing system for the demodulation along the fixed phase modulation axis which can be used in conjunction with the colour synchronizing system for the demodulation along the phase alternating modulation axis as disclosed in said pending patent application to permit an improved colour television receiver to be constructed.

In accordance with the invention, a reference subcarrier of a fixed phase is obtained from the output of a local oscillator having an oscillation frequency which is either higher or lower than the frequency of the colour subcarrier by $2n - 1/2$, in particular ½, times the line frequency, or from two local oscillators having the higher and lower oscillation frequencies, respectively. Such output or either of the two outputs may also be produced in the manner described in said pending patent application. Since the output frequency of the local oscillator or oscillators is different or offset from the frequency of the colour carrier, the oscillator output will be referred to hereinafter as "offset subcarrier" to provide distinction over the reference subcarrier as used in the prior art. The offset subcarrier which has the same frequency as one of the sidebands contained in the colour sync signal may be derived from such one sideband by means of a sideband amplifier or ringing oscillator including a crystal filter.

In order to perform synchronous detection in the normal manner, the offset subcarrier is modified into a subcarrier of a frequency which is equal to double the colour subcarrier frequency, and this subcarrier is passed through a frequency divider, the output of which is controlled in respect to its polarity by a pulse derived by phase detection of the offset subcarrier and the colour sync signal, thereby obtaining a reference subcarrier having the same frequency as the colour subcarrier and a fixed phase which is coincident with the phase of the colour subcarrier. The reference subcarrier can be used in the demodulation of a chrominance signal to produce a desired colour signal. In this instance, the demodulation along the other modulation axis may be effected with an output from a phase modulator that phase modulates the offset subcarrier with a saw-tooth wave having the line frequency, the output being usable as a reference subcarrier at any instant during the trace time of each horizontal line.

Figure 2:
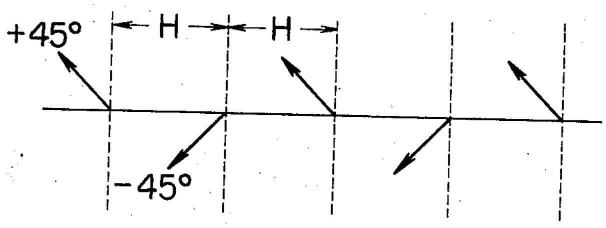
Figure 3:
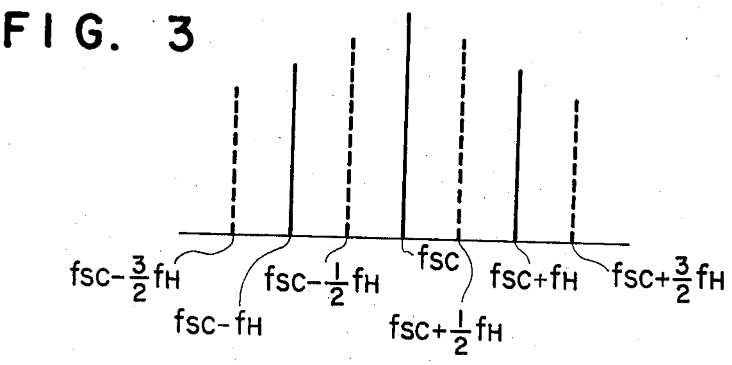
Figure 4:
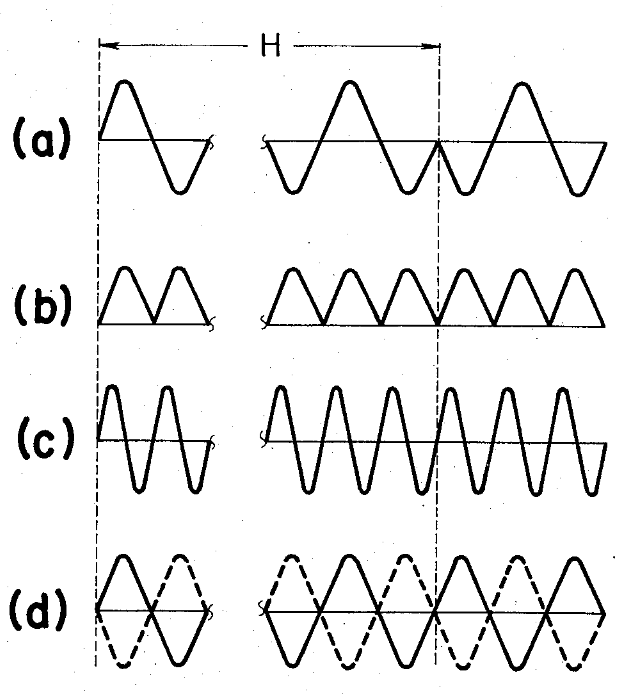
Figure 5:
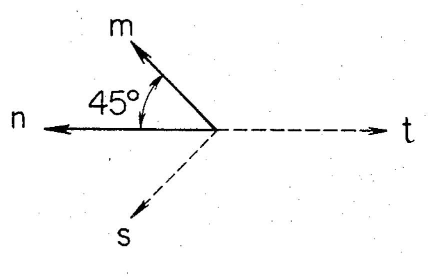
Figure 6:
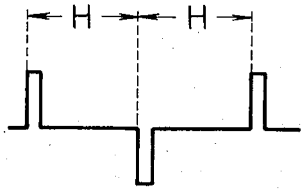
Figure 7:
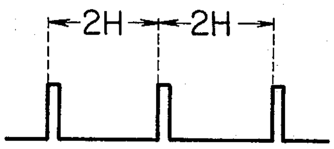
Figure 8:
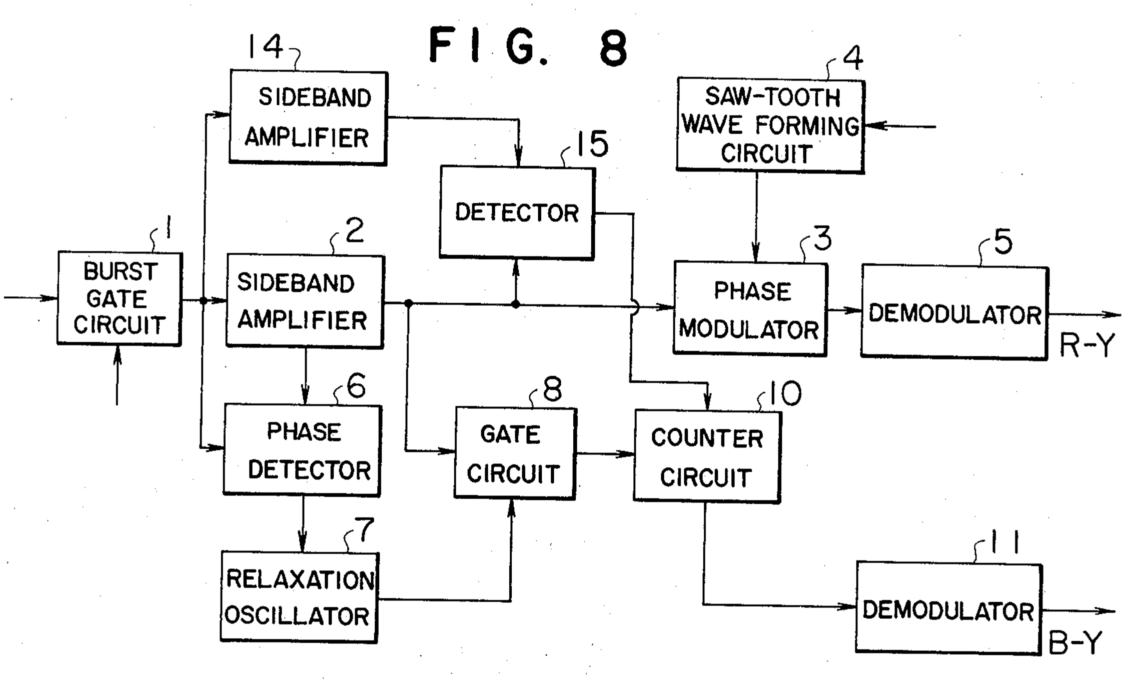
Figure 9:
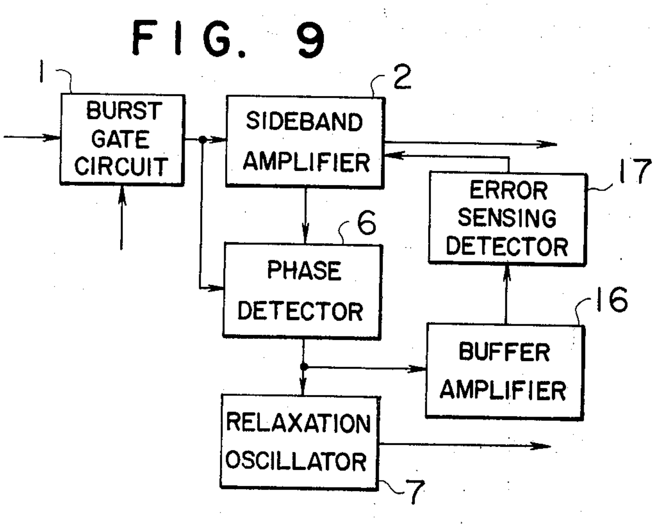
Figure 11:
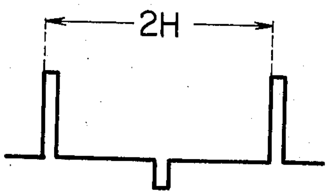
Figure 10:
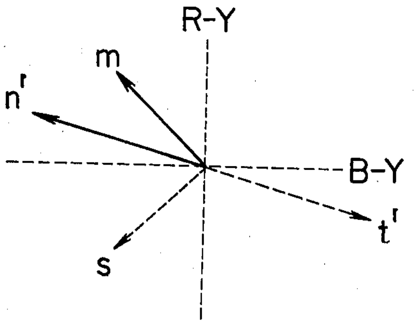

For a better understanding of the invention, several embodiments thereof will be described below with reference to the drawings: in which FIG. 1 is a block diagram of an embodiment of the invention, FIG. 2 is a vector diagram of the colour bursts, FIG. 3 is a frequency spectrum of the colour bursts shown in FIG. 2, FIG. 4 shows waveforms appearing in the system of FIG. 1, FIG. 5 is a vector diagram illustrating the phase relationship between the colour burst and the output of the sideband amplifier, as detected by the phase detector in the system of FIG. 1, FIG. 6 shows the waveform of the output of the phase detector for the phase relationship depicted in FIG. 5, FIG. 7 shows the waveform of the output from a relaxation oscillator synchronized with the pulses shown in FIG. 6, FIG. 8 is a block diagram of another embodiment of the invention incorporating a pair of sideband amplifiers, FIG. 9 is a block diagram of part of a further embodiment of the invention incorporating an automatic phase control circuit, FIG. 10 is a vector diagram similar to FIG. 5 but illustrating a different phase relationship, and FIG. 11 shows the waveform of the output from the phase detector for the phase relationship shown in FIG. 10.

Referring to FIG. 1, which illustrates the principle of the invention, there is shown a burst gate circuit 1. As is well known, a chrominance signal is applied to the burst gate circuit together with a gate pulse which may be horizontal flyback pulse, which renders the gate open during the duration of the pulse, thereby separating the colour sync signal from the chrominance signal as it is passed to the output of the gate circuit. In the currently prevailing PAL system, the colour sync signal comprises a pair of signal components which appear coincidently in time, so that the colour sync signal has an alternating phase of ±45° and −45° for successive horizontal lines, as shown in FIG. 2. The frequency spectrum of the colour sync signal is shown in FIG. 3, wherein it will be noted that it includes sidebands of frequencies $fsc \pm 2n - 1/2\ fH$, i.e. frequencies higher or lower than the colour subcarrier frequency fsc by $2n - 1/2$ times the line frequency fH. Thus when the output of the burst gate circuit 1 is applied to a sideband amplifier 2 incorporating a crystal filter to extract and amplify one of the sidebands which can be used as the offset subcarrier menntioned above. The sideband amplifier 2 may be replaced by a local oscillator incorporating an automatic phase control (APC) and having an oscillation frequency of $fsc \pm 2n - 1/2\ fH$, using the output from the burst gate circuit 1 to synchronize the oscillator output with the colour burst. Further, it will be appreciated that the same result may be obtained by substituting 11 ringing oscillator for the sideband amplifier.

The offset subcarrier as obtained at the output of the sideband amplifier 2 is fed to a phase modulator 3 in which it is phase modulated by a modulating wave having a period H (reciprocal of the line frequency) and supplied from a saw-tooth wave forming circuit 4. As a result of such phase modulation, there is obtained an output from the phase modulator 3 which can be used as a reference subcarrier in a demodulator 5 for demodulating the chrominance signal along the phase alternating modulation axis i.e. the R-Y axis. This part of the demodulation does not form any part of the invention and therefore further detail will not be described herein.

In accordance with the invention, the output of the phase modulator 3 is also fed to a frequency multiplier 9 which comprises a full wave rectifier including a pair of diodes and an output circuit tuned to double the frequency of the colour subcarrier. FIG. 4(*a*) shows the output from the phase modulator, and it will be noted from this figure that it is reversed in phase for every horizontal line. FIG. 4(*b* ) shows the waveform of the output as rectified by the full wave rectifier, and FIG. 4(*c*) shows the output from the frequency multiplier 9, having a frequency equal to double the colour subcarrier frequency. As is clearly noted in FIG. 4(*c*), the output from the frequency multiplier 9 has a constant amplitude and a fixed phase that remains unchanged for successive horizontal lines. This output is supplied to a counter circuit 10 which has a resonant circuit tuned to the frequency of the colour subcarrier, thereby obtaining a frequency divided subcarrier of a frequency equal to the colour subcarrier frequency and having a constant amplitude and a fixed phase which remains unchanged for successive horizontal lines. The output of the counter circuit 10 is synchronized with the colour subcarrier and is obtained by synchroniz0tion with the sideband of the colour sync signal or second component thereof.

However, as shown in solid and dotted lines in FIG. 4(d), the output of the counter circuit 10 may have a selective polarity and for its use as a reference subcarrier, the polarity must be fixed consistently. For this purpose, an identifying pulse having the same period as double the line period is derived from a phase detector 6 which is supplied with the colour burst and an offset subcarrier from the colour burst gate circuit 1 and the sideband amplifier 2, respectively. Preferably, a relaxation oscillator 7 is connected to and synchronized with the output of the phase detector 6. The identifying pulse is fed to a gate circuit 8 as a gate pulse thereto, and thus the offset subcarrier applied as a second input to the gate circuit 8 is permitted to pass therthrough as a polarity identifying burst which comprises oscillations continuing for a short interval for every period which is equal to double the line period. Such burst is effective in the counter circuit 10 to control the choice of the polarity of the output waveform therefrom. Consequently, the output from the counter circuit 10 can be directly used as a reference subcarrier of a fixed phase for the synchronous detection of the chrominance signal in a demodulator 11.

The operation of the phase detector 6 will now be described more fully. The phase detector 6 is suplied with the colour burst and the offset subcarrier in a suitable phase relationship. If the phase relationship is such as is shown in FIG. 5 where colour sync signal is indicated by an arrow or phase vector *m* and the offset subcarrier during the same line period is indicated at a phase position shown by an arrow or phase vector *n*, the next following colour sync signal will be in an inverted position indicated by an arrow s in dotted lines and the corresponding offset subcarrier will be in a phase position shown by an arrow *t* in dotted lines. For such a phase relationship, the phase detector 6 will produce identifying pulses as shown in FIG. 6 which reverse in polarity for every line period. Thus the identifying pulses have a period which is equal to double the line period H. These identifying pulses can be produced by the phase detector 6 for a phase relationship different from that shown in FIG. 5 or even when phase vectors *m* and *n* are in phase, which corresponds to the use of a colour sync signal, of which first and second components appear in succession in distinction to the current PAL system. These identifying pulses are used in the gate circuit 8 to form a control burst oscillating for each period thereof, as mentioned previously. To assure stable operation of the gate circuit 8, the output from the phase detector 6 is preferably applied through a relaxation oscillator 7 rather than being applied directly, the oscillator 7 being capable of oscillating with a frequency equal to half the line frequency and synchronized with such pulses. The relaxation oscillator 7 may be either a multivibrator or a blocking oscillator, which then will apply to the gate circuit 8 pulses of the form shown in FIG. 7.

Referring to FIG. 8 which shows another embodiment of the invention in which corresponding parts are designated by like reference numerals, the frequency multiplier 9 of the previous embodiment is omitted and instead a sideband amplifier 14 and a detector 15 are provided to effect "beat direction" of two offset subcarriers in an additive manner in order to derive a subcarrier of a frequency which is double the colour subcarrier frequency from a sideband of the colour sync signal or from an offset subcarrier synchronized therewith.

Specifically, the additional sideband amplifier also extracts an offset subcarrier of a frequency fsc $\pm 2n - 1/2$ fH from the sidebands of the colour sync signal as does the sideband amplifier 2, but the selective frequencies of these sideband amplifiers are such that one of them extracts a sideband of a frequency higher than the colour subcarrier frequency by $2n - 1/2$ times the line frequency while the other extracts another sideband of a frequency lower than the colour subcarrier frequency by the same amount. Thus the sideband amplifiers 2 and 14 amplify sideband waves of frequencies above and below the center frequency of fsc and displaced therefrom by $2n - 1/2$ times the line frequency. The sideband amplifier may also be constituted by a ringing oscillator or by a local oscillator with APC and synchronized with the selected sideband. By applying these two offset subcarriers to the detector 15 to provide beat detection in the additive manner, a subcarrier of a frequency equal to double the colour subcarrier frequency is obtained as indicated by the following equation: $(\text{fsc} \pm 2n - 1/2\ \text{fH}) + (\text{fsc} - 2n - 1/2\ \text{fH}) = 2\ \text{fsc}$ The detector 15 includes a resonant circuit tuned to 2 fsc in its output circuit, thereby producing an output having the same waveform shown in FIG. 4(*c*) as the output from the frequency multiplier 9 of the previous embodiment. The output of the detector 15 is applied to the counter circuit 10 and is processed in a similar manner as before to produce a reference subcarrier of a frequency equal to the colour subcarrier frequency and having a fixed phase.

While the frequency of the offset subcarrier remains stationary at a predetermined value, its phase may be subject to deviation from a given phase relationship with respect to the colour sync signl due to variation of temperature coefficients of the circuit, aging or fluctuation of supply voltage. To avoid such deviation, the invention contemplates the use of an automatic phase control circuit for maintaining a fixed phase relationship between the colour sync signal and the offset subcarrier.

Another embodiment of the invention incorporating such an automatic phase control circuit is shown in FIG. 9 in which corresponding parts are designated by like reference numerals as used in FIG. 1. Additional numberals 16 and 17 denote a buffer amplifier and an error sensing detector, respectively. When the output of the phase detector 6 is represented by pulses of alternating polarities as shown in FIG. 6, this indicates that the offset subcarrier applied to the phase detector 6 from the sideband amplifier 2 has a correct phase intermediate the alternating phases of the colour sync signal as shown in FIG. 5. However, when a deviation occurs in the phase of the offset subcarrier as shown by a vector *n'* in FIG. 10, the resulting output from the phase detector 6 will be of different magnitudes for the positive and negative pulses (FIG. 11). Under such a situation, the buffer amplifier 16 operates to amplify the output of the phase detector 6 to a suitable magnitude and the error sensing detector 17 is operable to derive a control voltage in response to these differential magnitudes of alternating pulses, the control voltage being used to correct the phase of the local oscillator 2 properly.

The above description of the invention deals with deriving a reference subcarrier of a fixed phase and having a frequency equal to the colour subcarrier frequency from an offset subcarrier, and it also refers to deriving another reference subcarrier of alternating phase from an offset subcarrier. Also a colour synchronizing system has been mentioned in which both of these reference subcarriers depends directly on the presence of only one of the two components of the colour sync signal.

What is claimed is:

1. A colour synchronizing or for colour television receiver for use in transmission system such as PAL system in which the colour television signal includes a pair of colour signals providing quadrature balanced modulation of a colour subcarrier with respect to first and second mutually perpendicular modulation axes, the second of which undergoes phase alternation of 180° for successive horizontal lines, and further includes a colour sync signal at the frequency of said colour subcarrier which provides identification of said first and second mutually perpendicular modulation axes said system comprising means for providing an offset subcarrier of a frequency fsc $\pm 2n - 1/2$ fH, where fsc denotes the frequency of said colour subcarrier, fH line frequency and *n* a positive interger greater than zero, and means providing a reference subcarrier for use in demodulation along said first modulation axis; said reference subcarrier providing means comprising means producing a subcarrier of a frequency double the frequency of said colour subcarrier from said offset subcarrier, means for frequency dividing by two the subcarrier of said double frequency thereby resulting in a frequency equal to the frequency of said colour subcarrier of two polarities, and means for selecting either polarity of the resulting subcarrier for said reference subcarrier.

2. Colour synchronizing system according to claim 1, in which said means for providing said offset subcarrier comprises means for extracting and amplifying one of the side bands contained in the colour sync signal.

3. Colour synchronizing system according to claim 1, in which said means for producing said subcarrier of a frequency equal to double the frequency of the colour subcarrier comprises means effective to phase modulate the offset subcarrier with a sawtooth wave of a frequency equal to the line frequency, and means for frequency doubling the phase modulated subcarrier.

4. Colour synchronizing system according to claim 1, in which said means for producing said subcarrier of a frequency equal to double the frequency of the colour subcarrier includes means for producing an additional offset subcarrier of a frequency $fsc \pm 2n - 1/2\, fH$, where fsc, fH and $n$ are as previously defined, the frequencies of the first mentioned and additional offset subcarriers being equally spaced from the frequency of the colour subcarrier on opposite sides thereof, and means for heterodyning the two offset subcarriers in an additive manner.

5. Colour synchronizing system according to claim 1, said system further comprising means for phase detecting said colour sync signal and said offset subcarrier to produce a control signal, and means responsive to said control signal to control the phase of said offset subcarrier.

6. Colour synchronizing system according to claim 1, in which said means for selecting the polarity of the frequency divided subcarrier comprises means for phase detecting said colour sync signal and said offset subcarrier to produce a pulse having a period equal to double the line period.

7. Colour synchronizing system according to claim 6, in which said means for selecting the polarity of the frequency divided subcarrier further comprises a burst gate circuit to which the offset subcarrier is applied as an input, and means for applying said pulse to the gate circuit as a gating pulse.

8. Colour synchronizing system according to calim 7, wherein said means for applying comprises relaxation oscillator means having an oscillation frequency equal to half the line frequency synchronized by said pulse.

* * * * *